W. N. BOOTH.
STRAIGHT SIDE DEMOUNTABLE RIM.
APPLICATION FILED DEC. 15, 1913.
1,244,022.
Patented Oct. 23, 1917.
2 SHEETS—SHEET 1.
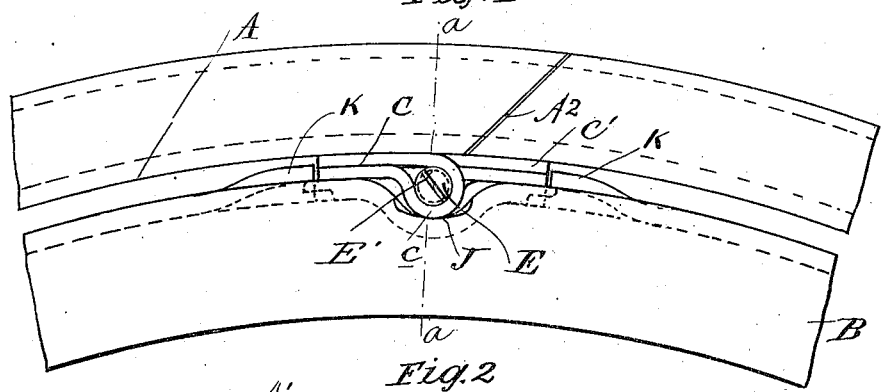
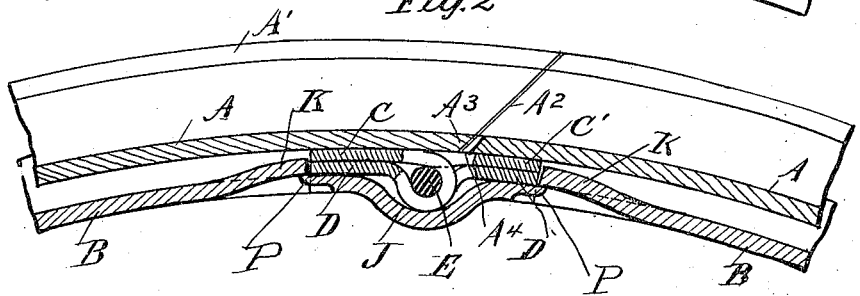
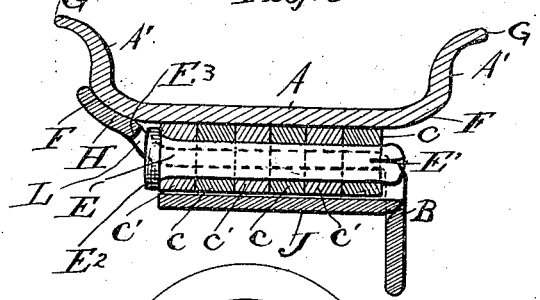
Witnesses
P. Bredel
E. C. Montague
Inventor
William N. Booth W. N. BOOTH.
STRAIGHT SIDE DEMOUNTABLE RIM.
APPLICATION FILED DEC. 15, 1913.
1,244,022.
Patented Oct. 23, 1917.
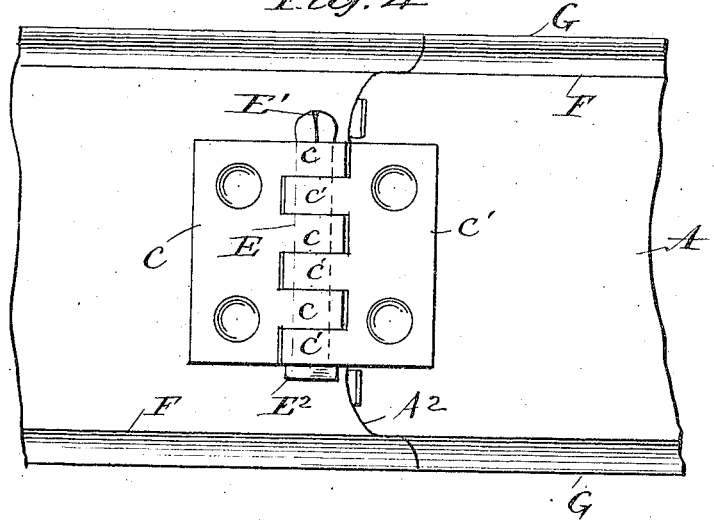
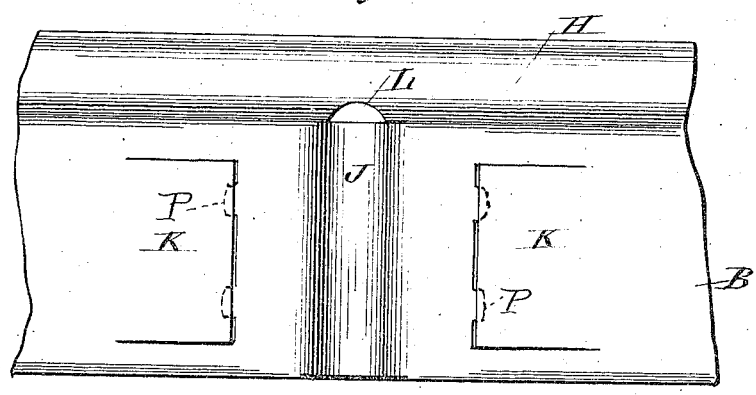
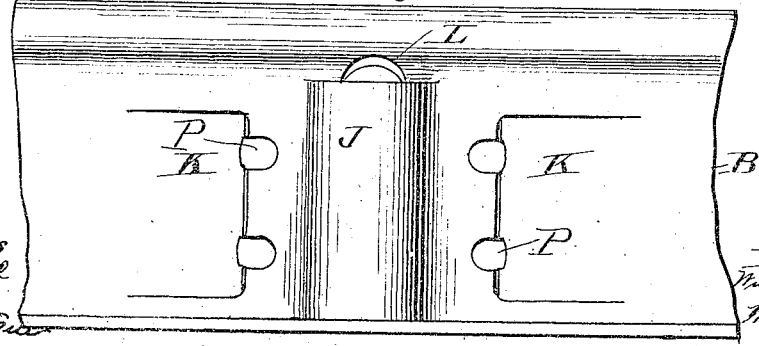

UNITED STATES PATENT OFFICE.

WILLIAM N. BOOTH, OF DETROIT, MICHIGAN, ASSIGNOR TO KELSEY WHEEL COMPANY, INC., OF DETROIT, MICHIGAN, A CORPORATION OF NEW YORK.

STRAIGHT-SIDE DEMOUNTABLE RIM.

1,244,022.
Specification of Letters Patent.
Patented Oct. 23, 1917.

Application filed December 15, 1913. Serial No. 806,819.

*To all whom it may concern:*

Be it known that I, WILLIAM N. BOOTH, a citizen of the United States, and resident of Detroit, in the county of Wayne and State of Michigan, have invented certain new and useful Improvements in Straight-Side Demountable Rims, of which I hereby declare the following to be a full, clear, and exact description, such as will enable others skilled in the art to which it appertains to make and use the same.

The objects of the invention are to provide a split tire holding rim having straight sides with means for securing the split extremities together, and for preventing the slipping or rotation of the split rim upon the felly rim of an automobile wheel.

The invention comprises the combination with the split extremities of the rim, of means for detachably locking them together and for engaging the periphery of the felly rim as hereinafter described, shown in the accompanying drawings and specifically pointed out in the claims.

In the accompanying drawings Figure 1 is a side elevation of the attached ends of the split rim mounted upon the felly rim; Fig. 2 is a longitudinal section thereof; Fig. 3 is a transverse section thereof on line $a$—$a$ Fig. 1; Fig. 4 is a bottom view of a portion of the split rim; Fig. 5 is a plan view of the upper side of the felly rim; Fig. 6 is a plan view of the lower side thereof; Fig. 7 is a side elevation of the rim and tire showing the manner of removing the rim.

In these views A represents the split tire holding rim having straight sides $A'$, $A'$ and a transverse diagonal cut $A^2$ which permits of bending inwardly the separated ends of the rim to remove the tire therefrom when the tire holding rim has been removed from the felly rim. B is the felly rim.

To secure the extremities of the tire holding rim together plates C and C′ are attached by riveting, welding or any suitable method to the inner face of the tire rim, and eyes $c$, $c'$ are attached to the opposite edges of these plates, which interlock with each other when the parts are assembled together.

The plate C′ preferably projects beyond the edge $A^4$ of the split rim and overlaps the edge $A^3$ and the plate C is set back a corresponding distance from the edge $A^3$.

These eyes are preferably formed by bending backward slotted and spaced portions of the plates, and securing the overlapping portions together at D, D.

The eyes $c$ upon one plate alternate with the eyes $c'$ on the other plate, and interlock therewith when assembled together, and a pin E preferably split at the outer end at E′ is inserted through the eyes before placing the tire holding rim upon the felly rim.

The tire holding rim is curved outward and upward at its edges at F, F and thence upward and outward to its flanged extremities G, G.

The felly rim is correspondingly curved at its rear edge at H to fit closely upon the edge F of the outer rim and has its body portion spaced therefrom and parallel to the rim A. The felly rim is bent inwardly to form a socket at J in which eyes rest and upon either side of this socket lugs K, K are struck up out of the body portion of the felly rim and pointing toward each other between which the plates C and C′ rest and the outer edges of these plates engage with the edges of the lugs, thus preventing circumferential movement of the tire holding rim upon the felly rim.

The pin E is provided with a head $E^2$ upon the inner side of the tire rim, which may engage the wall of the rim where the curved portion has been separated therefrom at $E^3$ and thus be prevented from escaping from the eyes until the outer rim has been removed.

This mode of construction permits of the rims to be formed of comparatively thin metal of standard gage and the eyes are also formed of metal of similar thickness.

The plates C and C′ provide a spacing means between the outer and inner rims and form rigid bearings therefor upon each other.

The metal about the head of the pin is preferably somewhat cut away at L to obtain smoothness of contour in the side of the felly rim.

At P, P are shown small lugs formed by stamping the cut edge of the opening from which the lugs K are cut.

The lugs P, P extend underneath the free edges of the lugs K and support them to prevent them from being depressed to their original level.

In Fig. 7 the mode of separating the extremities of the split rim by means of an ordinary screw driver is shown.

When this is accomplished the rim will contract and the tire is easily removed.

Having described the invention what I claim as new and desire to secure by Letters Patent is:

1. As an article of manufacture, a band for vehicle wheels of the demountable rim class, said band being provided with two similar, spaced driving lugs, stamped up from and integral with the material of said band, said lugs being severed from said band along their juxtaposed edges so as to form abrupt shoulders, substantially as described.

2. In a vehicle wheel, the combination with the wheel-felly and the felly-band thereon; of a demountable rim adapted to be fitted around said felly-band and provided with a driving plate on its inner face, said felly band being provided with two spaced driving lugs adapted to interlock with said plate, said lugs being stamped up from and integral with the material of said band, substantially as described.

3. In a vehicle wheel, the combination with the wheel-felly and the felly-band thereon, of a demountable rim adapted to be fitted around said felly-band and provided with a driving plate on its inner face, said felly band being provided with two similar spaced driving lugs, stamped up from and integral with the material of said band, said lugs being severed from said band along their juxtaposed edges so as to form abrupt shoulders, substantially as described.

4. As an article of manufacture, a band for vehicle wheels, of the demountable rim class, said band being provided with a driving lug, stamped up from and integral with the material of said band, said lug having a transverse edge severed from said band so as to form an abrupt shoulder, substantially as described.

5. In a vehicle wheel, the combination with the wheel-felly and the felly-band thereon; of a demountable rim adapted to be fitted around said felly-band, one of said members being provided with a driving plate on its juxtaposed face and the other member being provided with two spaced driving lugs adapted to interlock with said plate, said lugs being stamped up from and integral with the material of said member, substantially as described.

6. In a vehicle wheel, the combination with the wheel-felly and the felly-band thereon; of a demountable rim adapted to be fitted around said felly-band, one of said members being provided with a driving plate on its juxtaposed face and the other member being provided with two spaced driving lugs, stamped up from and integral with the material of said member, said lugs being severed from said member along their juxtaposed edges so as to form abrupt shoulders, substantially as described.

7. The combination with a transversely split channel shaped tire holding rim, of a felly rim extending upwardly and engaging said tire holding rim along one side thereof, interlocking apertured projections on said tire holding rim for holding the ends thereof in alinement, and a pin for passing through said projections and locking the same in place, said pin having an enlarged head on the side of said projections toward the upturned edge of the felly rim, the felly rim being recessed to receive said enlarged head and being adapted to prevent the pin from disengaging itself from said projections.

In testimony whereof, I hereunto set my hand this 6" day of June 1913.

WILLIAM N. BOOTH.

In presence of—
F. B. KAVANAGH,
WM. M. MONROE.